United States Patent

Turbessi et al.

[11] Patent Number: 5,816,099
[45] Date of Patent: Oct. 6, 1998

[54] MOTORCYCLE WINDSHIELD WIPER DRIVE ASSEMBLY

[76] Inventors: Timothy Turbessi; Jim Galloway, both of 51 Maxwell Rd., Rydol, Ga. 30171

[21] Appl. No.: 787,631

[22] Filed: Jan. 23, 1997

[51] Int. Cl.⁶ .............................. F16H 21/40; B60S 1/06; B60S 1/22
[52] U.S. Cl. .............................................. 74/53; 15/250.3
[58] Field of Search ................................ 74/53; 15/250.3

[56] References Cited

U.S. PATENT DOCUMENTS

| | | | |
|---|---|---|---|
| 1,839,175 | 12/1931 | Hueber | 15/250.3 |
| 4,027,354 | 6/1977 | Burpee | 15/250.3 |
| 4,529,242 | 7/1985 | Watanabe et al. | 296/78.1 |
| 4,958,405 | 9/1990 | Kuhbauch | 15/250.33 |
| 5,274,876 | 1/1994 | Wehrspann | 15/250.17 |

FOREIGN PATENT DOCUMENTS

| 460550 | 5/1928 | Germany | 15/250.3 |
|---|---|---|---|

Primary Examiner—Allan D. Herrmann
Attorney, Agent, or Firm—Joseph N. Breaux

[57] ABSTRACT

A motorcycle windshield wiper drive assembly that includes a mounting bracket having a central motor support portion, a first bracket end connecting portion having a first mounting aperture formed therethrough, and a second bracket end connecting portion having a second mounting aperture formed therethrough; a reduction gear motor assembly mounted to the central motor support portion and having a motor assembly output shaft; a wiper shaft support extending from the central motor support portion and having a wiper shaft support bushing provided within a bushing aperture; a wiper shaft having a first shaft end rotatably entrapped within the wiper shaft bushing, a spring connecting aperture, and a second shaft end; a drive cam mounted onto the motor assembly output shaft; and a push rod linkage including a torsion spring having a coiled portion positioned over the wiper shaft, a first spring end positioned within the spring connecting aperture of the wiper shaft and a second spring end that is anchored with respect to the first spring end.

8 Claims, 3 Drawing Sheets

5,816,099

MOTORCYCLE WINDSHIELD WIPER DRIVE ASSEMBLY

TECHNICAL FIELD

The present invention relates to drive assemblies for windshield wiper systems and more particularly to a windshield wiper drive assembly for a motorcycle windshield that includes a wiper drive shaft coupled to a drive motor through a torsion spring biased push rod linkage and a drive cam.

BACKGROUND OF THE INVENTION

The visibility through a motorcycle windshield decreases significantly when driving the motorcycle in rainy weather. It would be a benefit, therefore, to have a windshield wiper system that could wipe the windshield of rain accumulation to increase the visibility through the windshield. It would be a further benefit to have a motorcycle windshield wiper drive assembly that was easily mounted to a motorcycle windshield.

SUMMARY OF THE INVENTION

It is thus an object of the invention to provide a motorcycle windshield wiper drive assembly.

It is a further object of the invention to provide a motorcycle windshield wiper drive assembly that is easily mounted to a motorcycle windshield.

It is a still further object of the invention to provide a motorcycle windshield wiper drive assembly that includes a wiper drive shaft coupled to a drive motor through a torsion spring biased push rod linkage and a drive cam.

It is a still further object of the invention to provide a motorcycle windshield wiper drive assembly that accomplishes all of the above objects in combination.

Accordingly, a motorcycle windshield wiper drive assembly is provided. The drive assembly comprises a mounting bracket having a central motor support portion, a first bracket end connecting portion having a first mounting aperture formed therethrough, and a second bracket end connecting portion having a second mounting aperture formed therethrough; a reduction gear motor assembly mounted to the central motor support portion and having a motor assembly output shaft; a wiper shaft support extending from the central motor support portion and having a wiper shaft support bushing provided within a bushing aperture; a wiper shaft having a first wiper shaft end rotatably entrapped within the wiper shaft support bushing, a spring connecting aperture, and a second wiper shaft end; a drive cam mounted onto the motor assembly output shaft; and a push rod linkage including a torsion spring having a coiled portion positioned over the wiper shaft, a first spring end positioned within the spring connecting aperture of the wiper shaft and a second spring end that is anchored with respect to the first spring end. The push rod linkage preferably includes a push rod, having a roller wheel provided at a first push rod end thereof, that is pivotally connected at a second push rod end thereof to a wiper shaft arm that extends radially from the wiper shaft. The push rod is preferably slidably entrapped and guided by a push rod guide that is mounted to the motor assembly. In another preferred embodiment, the motorcycle windshield wiper drive assembly further includes a variable speed control mechanism for allowing the user to adjust the speed of the wiper movement as desired.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
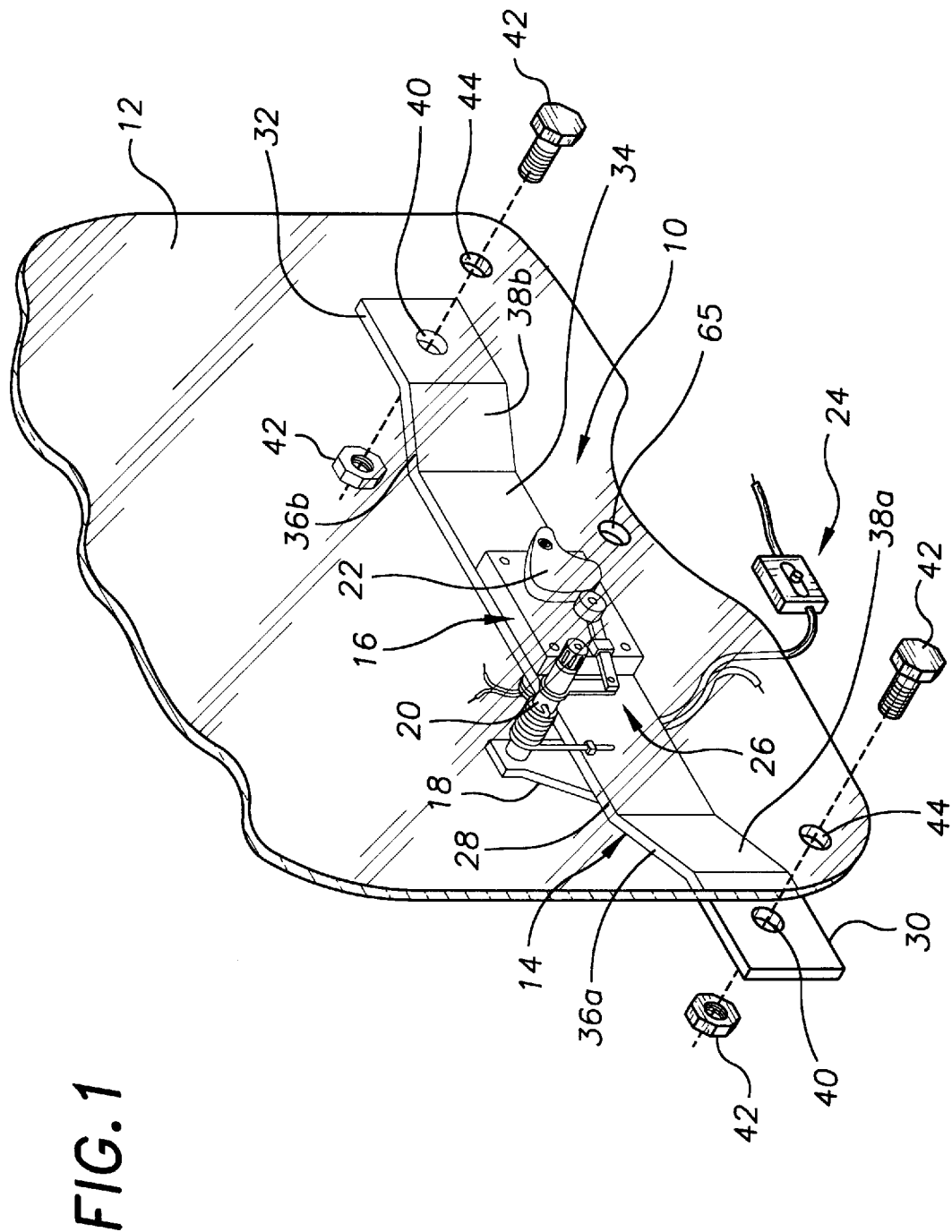
FIG. 1 is a perspective view of a representative motorcycle windshield and an exemplary embodiment of the motorcycle windshield wiper drive assembly of the present invention.

FIG. 1 shows an exemplary embodiment of the motorcycle windshield wiper drive assembly of the present invention, generally designated by the numeral 10, and a representative motorcycle windshield 12. Drive assembly 10 includes a mounting bracket, generally designated by the numeral 14; a reduction gear motor assembly, generally designated by the numeral 16; a wiper shaft support 18; a wiper shaft 20; a drive cam 22; a motor speed controller, generally designated by the numeral 24; and a push rod linkage, generally designated 26.

In this embodiment, mounting bracket 14 is constructed from a length of stainless steel bar stock that has been bent to form a central motor support portion 28, a first bracket end connecting portion 30, and a second bracket end connecting portion 32. Central motor support portion 28 is substantially rectangular shaped and has a planar mounting surface 34. First bracket end connecting portion 30 and second bracket end connecting portion 32 are, respectively, each connected to central motor support portion 28 by a connecting section 36a,36b. Each connecting section 36a,36b has a planar surface 38a,38b, respectively, that is oriented at an angle with respect to planar mounting surface 34 of about forty-five degrees. First and second bracket end connecting portion 30,32 each have a mounting aperture 40 formed therethrough to allow mounting bracket 14 to be affixed to windshield 12 by placing fasteners 42 sequentially through windshield apertures 44 and mounting apertures 40.

Figure 2:
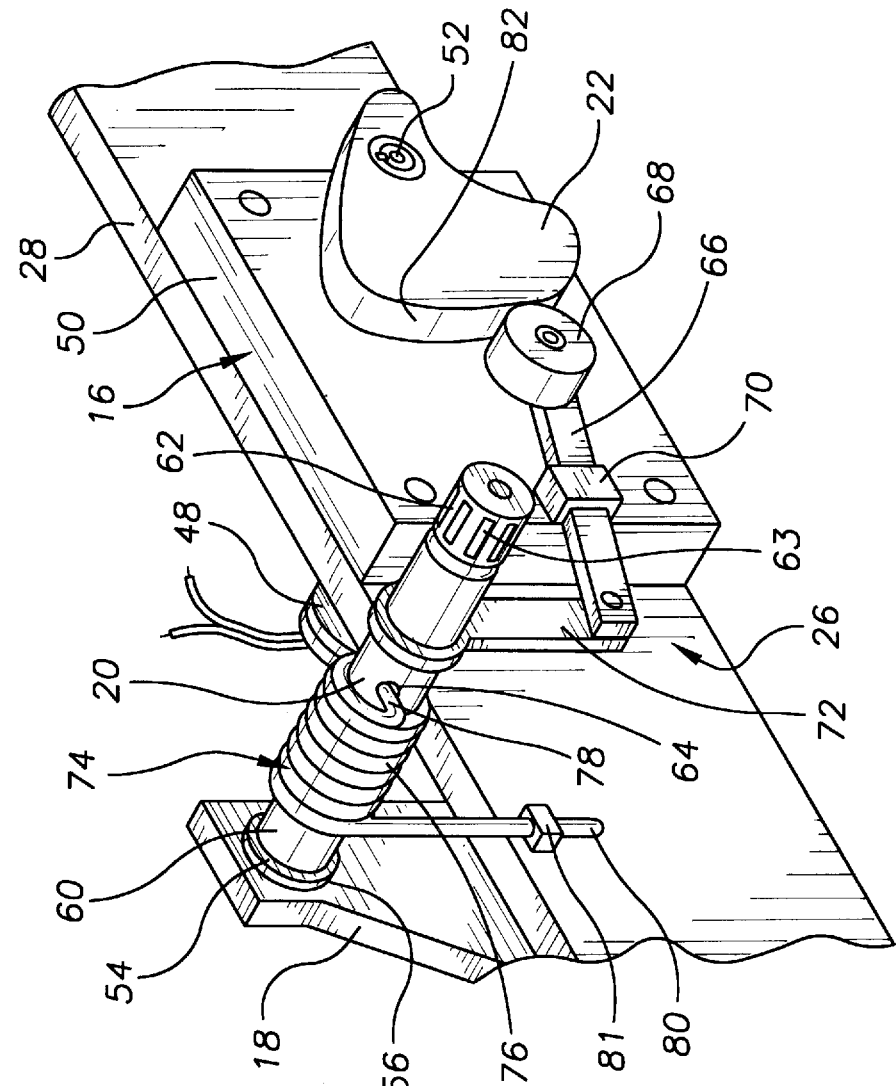
FIG. 2 is a detail view of the exemplary motorcycle windshield wiper drive assembly of FIG. 1 showing the central motor support portion of the mounting bracket, the reduction gear motor assembly, the wiper shaft support, the wiper shaft, the drive cam, and the push rod linkage including the torsion spring, the push rod, the wiper shaft arm, and the push rod guide.

Referring now to FIG. 2, reduction gear motor assembly 16 is mounted to central motor support portion 28. Reduction gear motor assembly 16 is of conventional construction and includes a variable speed electric motor 48 and a reduction gearbox 50 having a motor assembly output shaft 52.

Wiper shaft support 18 is a section of stainless steel bar stock that has been welded to central motor support portion 28. Although wiper shaft support 18 has been affixed to central motor support portion 28 by welding in this exemplary embodiment, other methods of attachment, including forming wiper shaft support 18 integrally with central motor support portion 28, are considered to be within the scope of the invention taught herein. Wiper shaft support 18 has a bushing aperture 56 within which a wiper shaft support bushing 54 is press fit.

Wiper shaft 20 is a section of conventional stainless steel shafting that has a first wiper shaft end 60 rotatably entrapped within bushing 54, a second wiper shaft end 62 provided with a number of protrusions 63 for engaging a wiper blade assembly, and a spring connecting aperture 64. During installation second wiper shaft end 62 is installed through a wiper shaft aperture 65 (FIG. 1) that is formed through the motorcycle windshield 12 and extends past the forward facing surface of motorcycle windshield a distance sufficient to allow a wiper assembly to be attached thereto.

Push rod linkage 26 includes a push rod 66, a roller wheel 68, a push rod guide 70, a wiper shaft arm 72, and a torsion spring 74. Torsion spring 74 has a coiled portion 76 positioned over wiper shaft 20, a first spring end 78 positioned within spring connecting aperture 64, and a second spring end 80 that is anchored to central motor support portion 28 by an anchoring tab 81. Wiper shaft arm 72 is rigidly connected to wiper shaft 20 and extends radially outward therefrom. Push rod 66 is slidably entrapped and guided by push rod guide 70 along a restricted straight line path. Push rod 66 has roller wheel 68 rotatably mounted at a first drive cam facing side thereof and is pivotally connected to wiper shaft arm 72 at an opposite end thereof in a manner such that movement of push rod 66 toward and away from motor assembly output shaft 52 causes wiper shaft 20 to rotate correspondingly back and forth. Torsion spring 74 provides a biasing force against wiper shaft 20 to cause wiper shaft arm 72 to force roller wheel 68 against a roller contact surface 82 of drive cam 22. It can be seen that through this arrangement rotation of drive cam 22 about motor assembly output shaft 52 causes wiper shaft 20 to rotate back and forth moving a wiper assembly attached to wiper shaft end 62.

Figure 3:
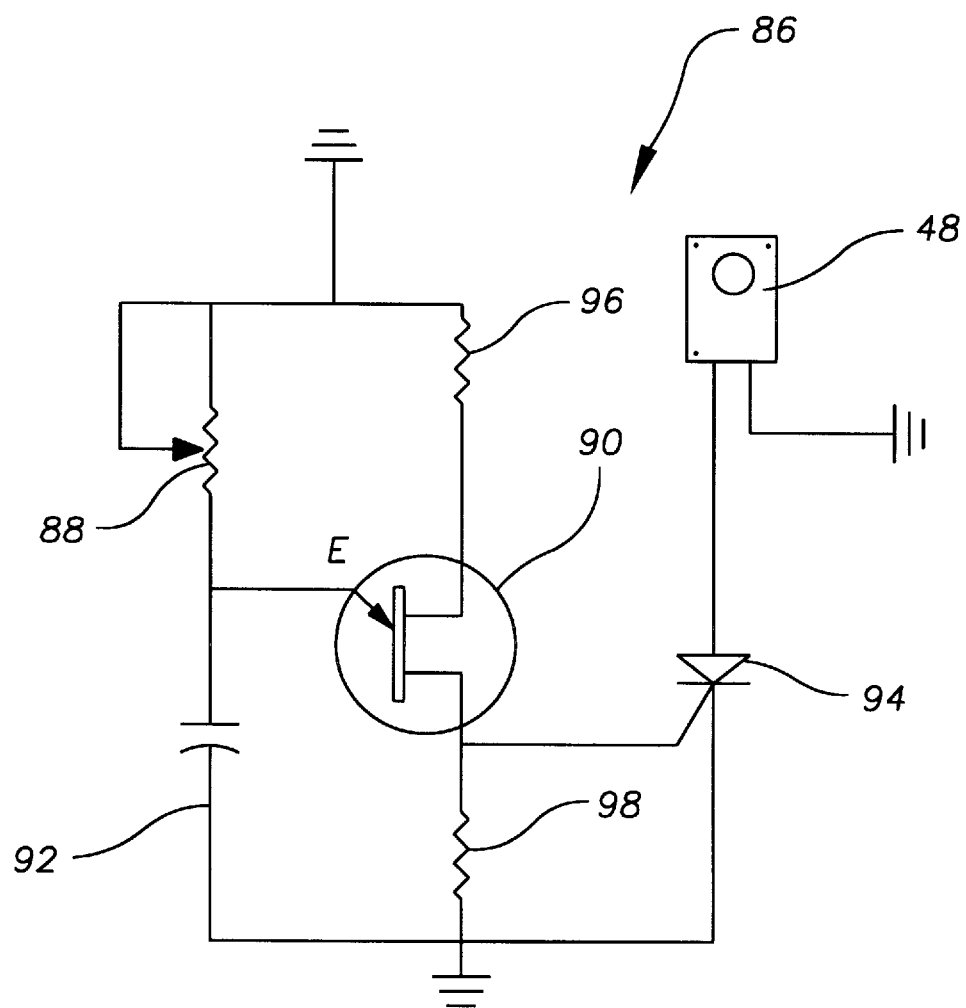
FIG. 3 is a schematic diagram of an exemplary wiper speed motor control circuit of the motor speed controller.

With reference to FIG. 3, variable speed control mechanism 24 (FIG. 1) includes a conventional intermittent drive circuit, generally designated 86 that includes a variable resistor 88, a transistor 90, a capacitor 92, a silicon controlled rectifier 94, and a pair of biasing resistors 96,98. In this embodiment, variable resistor 88 is adjustable by the user to select a desired wiping frequency.

It can be seen from the preceding description that a motorcycle windshield wiper drive assembly has been provided that is easily mounted to a motorcycle windshield and that includes a wiper drive shaft coupled to a drive motor through a torsion spring biased push rod linkage and a drive cam.

It is noted that the embodiment of the motorcycle windshield wiper drive assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A motorcycle windshield wiper drive assembly comprising:

a mounting bracket having a central motor support portion, a first bracket end connecting portion having a first mounting aperture formed therethrough, and a second bracket end connecting portion having a second mounting aperture formed therethrough;

a reduction gear motor assembly mounted to said central motor support portion and having a motor assembly output shaft;

a wiper shaft support extending from said central motor support portion and having a wiper shaft support bushing provided within a bushing aperture;

a wiper shaft having a first shaft end rotatably entrapped within said wiper shaft bushing, a spring connecting aperture, and a second shaft end;

a drive cam mounted onto said motor assembly output shaft; and a push rod linkage including a torsion spring having a coiled portion positioned over said wiper shaft, a first spring end positioned within said spring connecting aperture of said wiper shaft and a second spring end that is anchored with respect to said first spring end.

2. The motorcycle windshield wiper drive assembly of claim 1, wherein:

said push rod linkage includes a push rod and a wiper shaft arm, said push rod having a roller wheel provided at a first push rod end thereof, said push rod being pivotally connected at a second push rod end thereof to said wiper shaft arm, said wiper shaft arm extending radially from said wiper shaft.

3. The motorcycle windshield wiper drive assembly of claim 2, wherein:

said push rod is slidably entrapped and guided by a push rod guide.

4. The motorcycle windshield wiper drive assembly of claim 3 wherein:

said push rod guide is mounted to said motor assembly.

5. The motorcycle windshield wiper drive assembly of claim 1, wherein:

said motor assembly includes and electric motor; and said motorcycle windshield wiper drive assembly further includes:

a variable speed control mechanism in controlling connection with said electric motor.

6. The motorcycle windshield wiper drive assembly of claim 2, wherein:

said motor assembly includes and electric motor; and said motorcycle windshield wiper drive assembly further includes:

a variable speed control mechanism in controlling connection with said electric motor.

7. The motorcycle windshield wiper drive assembly of claim 3, herein:

said motor assembly includes and electric motor; and said motorcycle windshield wiper drive assembly further includes:

a variable speed control mechanism in controlling connection with said electric motor.

8. The motorcycle windshield wiper drive assembly of claim 4, wherein:

said motor assembly includes and electric motor; and said motorcycle windshield wiper drive assembly further includes:

a variable speed control mechanism in controlling connection with said electric motor.

* * * * *